(12) United States Patent
Galbreath (10) Patent No.: US 11,118,706 B2
(45) Date of Patent: Sep. 14, 2021

(54) TANK RETRO-FITTING COLLAR WITH SQUARE O-RINGS

(71) Applicant: FSI North America, Inc., Coraopolis, PA (US)

(72) Inventor: Eric J. Galbreath, Coraopolis, PA (US)

(73) Assignee: FSI North America, Inc., Coraopolis, PA (US)

(*) Notice: Subject to any disclaimer, the term of this patent is extended or adjusted under 35 U.S.C. 154(b) by 310 days.

(21) Appl. No.: 16/357,411

(22) Filed: Mar. 19, 2019

(65) Prior Publication Data

US 2020/0116279 A1 Apr. 16, 2020

Related U.S. Application Data

(60) Provisional application No. 62/746,029, filed on Oct. 16, 2018.

(51) Int. Cl.
*F16L 5/10* (2006.01)
*F16J 15/06* (2006.01)

(52) U.S. Cl.
CPC .............. *F16L 5/10* (2013.01); *F16J 15/061* (2013.01); *C02F 2201/004* (2013.01)

(58) Field of Classification Search
CPC ......... F16L 5/10; F16L 19/0218; F16L 47/10; F16J 15/061; C02F 2201/004
USPC .......................................... 285/379; 277/609
See application file for complete search history.

(56) References Cited

U.S. PATENT DOCUMENTS

| | | | |
|---|---|---|---|
| 3,615,109 A | | 10/1971 | Brinda et al. |
| 4,537,406 A | * | 8/1985 | Hirasuna .................. 277/609 |
| 4,623,123 A | | 11/1986 | Traylor |
| 5,316,320 A | * | 5/1994 | Breaker |
| 5,845,946 A | | 12/1998 | Thomas |
| 6,746,055 B1 | | 6/2004 | Wood et al. |
| 8,602,270 B2 | | 12/2013 | Takanohashi |
| 9,097,369 B2 | | 8/2015 | McGuire |
| 9,341,301 B2 | | 5/2016 | Davito |
| 9,470,317 B1 | | 10/2016 | Reed et al. |
| 2002/0030326 A1 | * | 3/2002 | Bettencourt ........... F16J 15/127 |
| 2003/0025328 A1 | * | 2/2003 | Schenk .................... 285/379 |
| 2009/0101568 A1 | | 4/2009 | Donaque et al. |

FOREIGN PATENT DOCUMENTS

| | | |
|---|---|---|
| EP | 0779244 | 11/1999 |
| EP | 1422463 | 10/2008 |
| EP | 1760382 | 7/2009 |

(Continued)

*Primary Examiner* — Zachary T Dragicevich
(74) *Attorney, Agent, or Firm* — McKay Law (57) ABSTRACT

A collar for use on a water filtration tank adapter. The collar is formed as a ring adapted to thread onto the tank connection end of the adapter and abut the nut portion between the tank connection end and the pipe end of adapter. An o-ring, square in cross-section, is disposed on a top surface of the collar, offset medially towards the center. This top o-ring is adapted to abut the nut portion of the adapter. Another o-ring, square in cross-section, is disposed on the bottom surface, offset medially away from the center. This bottom o-ring is adapted to abut the tank head upon use. Accordingly, a water-tight seal is formed at the tank connection end and tank head, the collar functioning as both a positive stop and as a substitute for pipe tape.

8 Claims, 6 Drawing Sheets

(56) References Cited

FOREIGN PATENT DOCUMENTS

| WO | WO0144707 | 6/2001 |
|---|---|---|
| WO | WO2011014341 | 2/2011 |

* cited by examiner

TANK RETRO-FITTING COLLAR WITH SQUARE O-RINGS

CROSS-REFERENCE TO RELATED APPLICATIONS

The present application claims benefit of provisional application Ser. No. 62/746,029 filed Oct. 16, 2018, the contents of which are incorporated herein by reference.

BACKGROUND

Field of the Invention

The present invention relates to sealing between fittings and tank heads, in particular, sealing water purification tanks.

Description of the Related Art

Water purification systems comprise, in part, the tank and the distribution hose or pipe stemming therefrom. The pipe is fitted to the tank using an adapter onto which the pipe with an NPT connection is threaded. Pipe tape is traditionally used to aid in the seal at both ends of the adapter. The pipe tape is used both at the main head connection of the adapter and the opposing pipe end so as to minimize air and water leaks. Problems are inherent in as much as the amount of desirable pipe tape is unknown, and the tape can break down resulting in leaks. In addition, the adapters are typically plastic, fastened by wrenches or by hand, and in either case of hand or tool tightening, plastic adapters can be overtightened and break or cause leakage.

Couplings are widely known in the art. EP 0779244 to Channell et al. shows a generally cylindrical extension. Fittings which are adapted for securement to liner have a generally cylindrical neck which extends below a neck flange. The fitting neck is inserted through opening and is co-operant with extension. An annular recess is located on neck within which a circumferential O-ring is disposed. Circumferential O-ring engages both neck and extension when neck is inserted into extension.

EP 1760382 to Braathen describes a connection for connecting a fitting to a water heater or other types of pressure tank. The connection comprises an adapter for permanent fitting to the tank, where the adapter and the fitting comprise complimentary formed parts, namely a holder and a pipe stub. The holder and the pipe stub each have a through boring to provide a fluid connection between the tank and the fitting. A nut is screwed onto the holder. The pipe stub comprises a locking groove for engagement of a locking ring. The nut is arranged to prevent the locking ring from moving axially in relation to the holder, so that the pipe stub is pre-vented from moving axially in relation to the holder.

U.S. Pat. No. 5,845,946 to Thomas teaches a coupling system for corrugated, flexible metal hoses includes fitting and washer assemblies. The fitting assembly comprises inner and outer fittings, the inner fitting being received on the hose and having a bore adapted to receive the washer assembly. The washer assembly includes an O-ring, a backer washer and an expandable washer. The O-ring forms a seal connection with the flexible metal hose and the fitting assembly. The expandable washer provides a stop against which the backer ring is pushed by the O-ring. The expandable washer is also clamped between the fitting assembly and a corrugation of the flexible hose to resist withdrawal of the latter. Modified embodiment hose coupling systems are also disclosed and include inner and outer gaskets, compression gaskets, termination plates mounting the outer fitting and different combinations of retainer rings, backer rings and gasket rings. An application of the coupling systems includes a fuel source, a fuel line, a manifold, the coupling system, a corrugated flexible hose and a gas-fired appliance.

U.S. Pat. No. 9,097,369 to McGuire shows a threaded union for tubulars used for high-pressure fluid applications includes a unitary nut supported by at least two nut retainer segments received under a top wall of the nut in an annular segment retainer groove in one of the tubulars. The nut retainer segments fully-support the unitary nut. The nut retainer segments are held in the annular segment retainer groove by securing the nut retainer segments in the segment retainer groove.

WO 01/44707 to Davidson describes a connector for forming a connection between the tubular end of a first fluid conveying member and a threaded end of a second fluid conveying member as a threaded portion for engagement with a threaded end of a sec-ond fluid conveying member. The connector is provided with means for engaging an external circumferentially extending groove located on the tubular end of said first fluid conveying member. Means are provided for effecting sealing engagement with said threaded end of said second fluid conveying member.

There is a need then for a means for eliminating the requirement of pipe tape while concurrently reducing the chances of overtightening as it relates especially to water purification tank adapters.

SUMMARY

Comprehended is a collar for use on a tank adapter. The collar is formed as a ring adapted to thread onto the tank connection end of the adapter and abut the nut portion between the tank connection end and the pipe end of adapter. An o-ring, square in cross-section, is disposed on a top surface of the collar, offset medially towards the center. This top o-ring is adapted to abut the nut portion of the adapter. Another o-ring, square in cross-section, is disposed on the bottom surface, offset medially away from the center. This bottom o-ring is adapted to abut the tank head upon use. Accordingly, a water-tight seal is formed at the tank connection end and tank head, the collar functioning as both a positive stop and as a substitute for pipe tape.

More particularly, in a filtration system including a tank having a main tank head and further including an adapter connected to the main tank head, the adapter having a pipe connection end, a tank connection end and a nut portion separating the pipe connection end and the tank connection end, the improvement comprises a collar, the collar having and inner surface, an outer surface, a top surface and a bottom surface, the top surface adapted to abut the nut portion upon placement on the tank connection end; the top surface having defined therein a cup-shaped top channel; a top o-ring disposed within the top channel, thereby sealing against the nut portion; the top channel offset medially towards the inner surface; the bottom surface having defined therein a bottom channel; the bottom channel offset medially towards the outer surface, and, a bottom o-ring disposed within the bottom channel, thereby sealing against the main tank head.

DETAILED DESCRIPTION OF THE PREFERRED EMBODIMENT

Referencing FIGS. 1-9, shown is a collar 1 for use on a tank adapter 2. The collar 1 can be threaded onto and thereby used on any type of fitting or adapter 2. Shown herein as an exemplary embodiment only is the collar 1 in use on the connection end of a plastic adapter 2 used to connect a pipe or tube to a water filtration tank having a main tank head 5.

Figure 1:
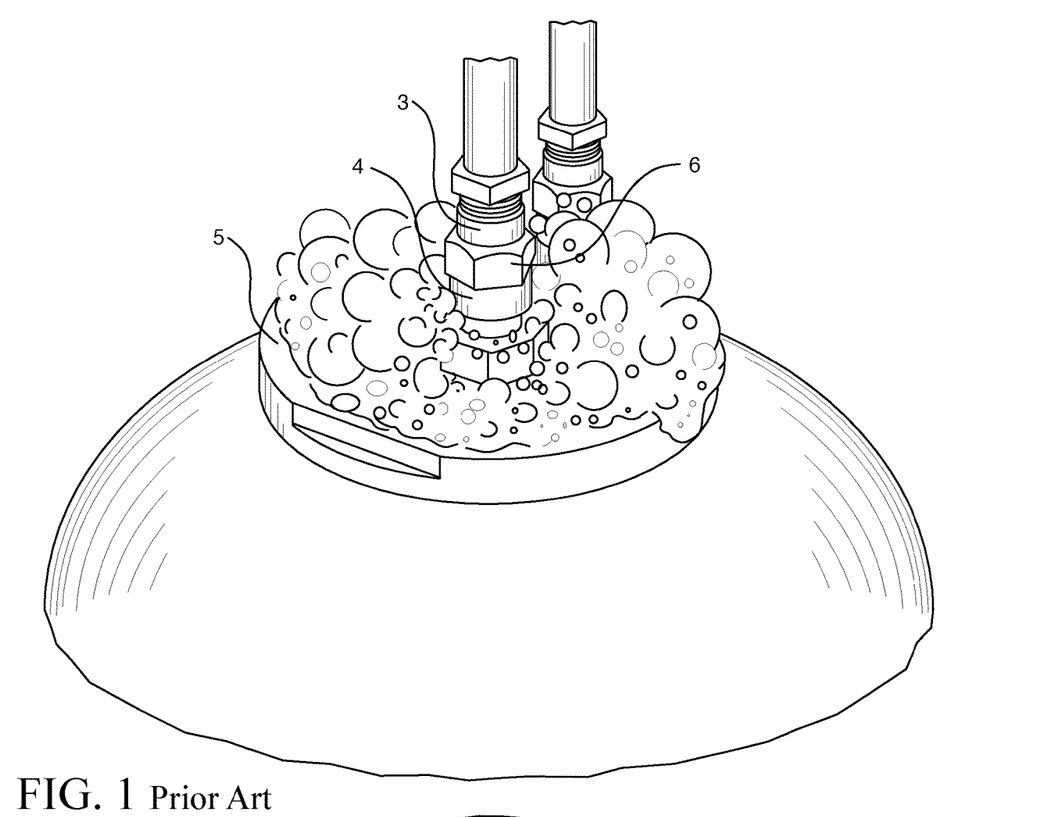
FIG. 1 shows a perspective view of the prior art connection system.
Figure 2:
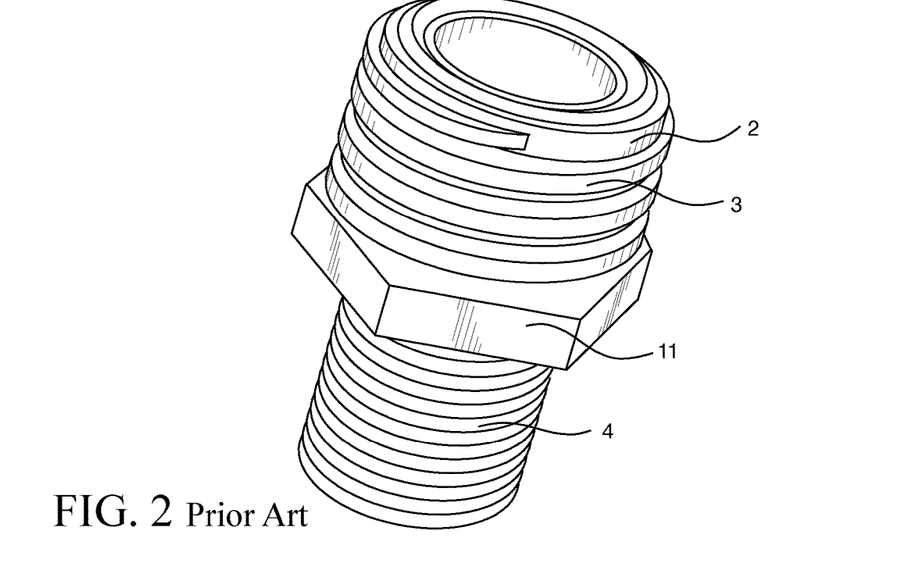
FIG. 2 shows a perspective view of the prior art fitting or adapter.
Figure 3:
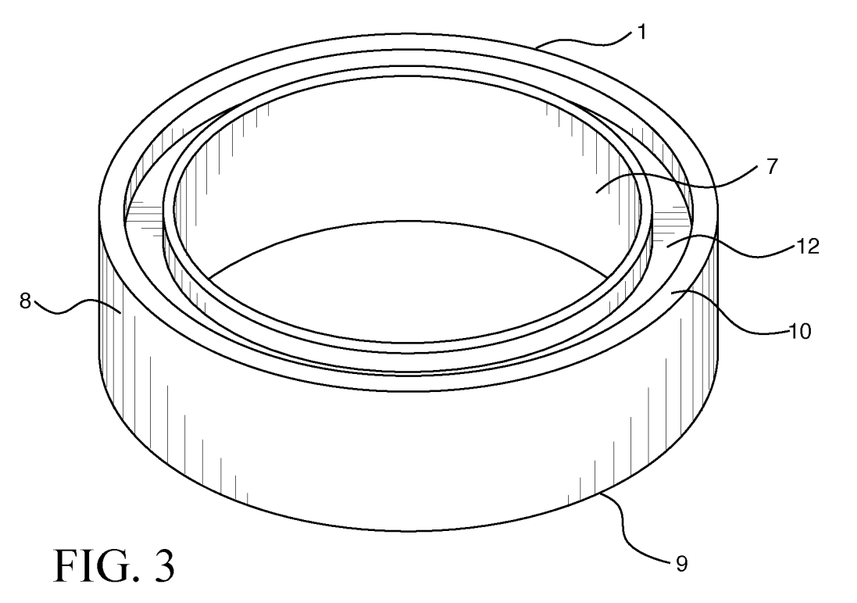
FIG. 3 shows a perspective view of the instant o-ring.
Figure 4:
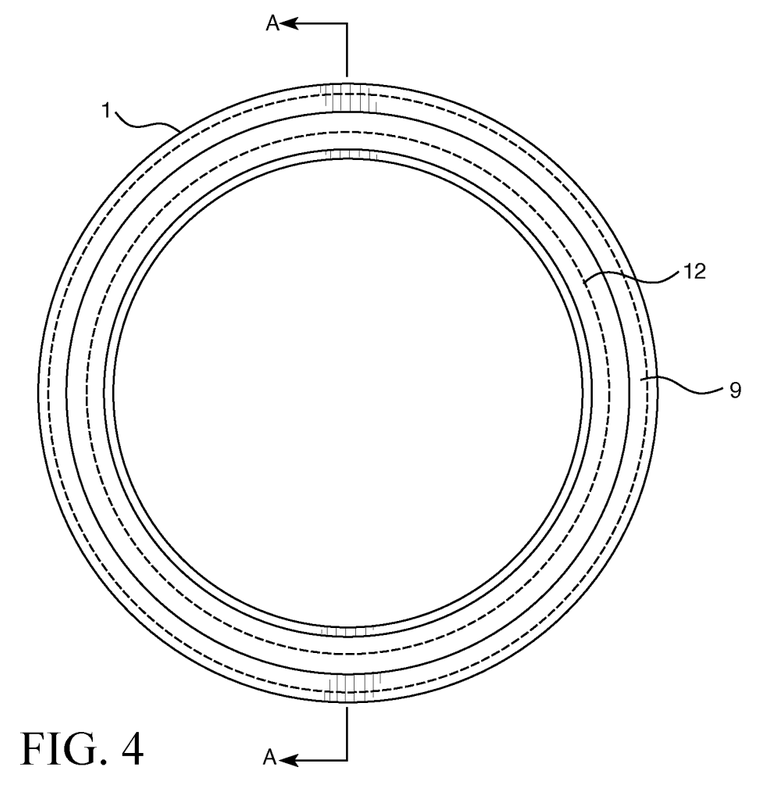
FIG. 4 shows a top view in elevation.
Figure 4A:
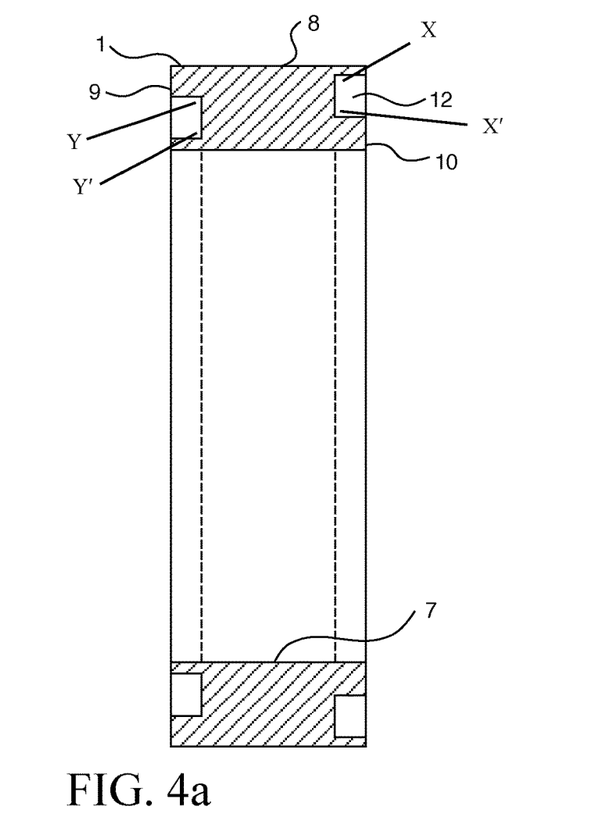
FIG. 4a shows a cross-sectional view of the o-ring through section A-A of FIG. 4.
Figure 5:
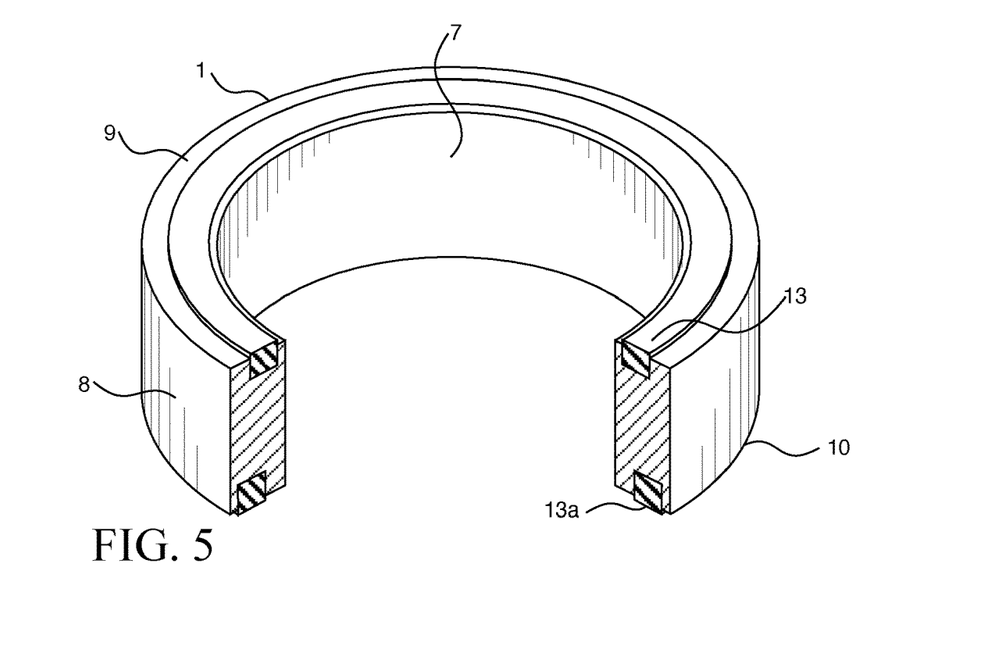
FIG. 5 shows a cut-out perspective view thereof.
Figure 6:
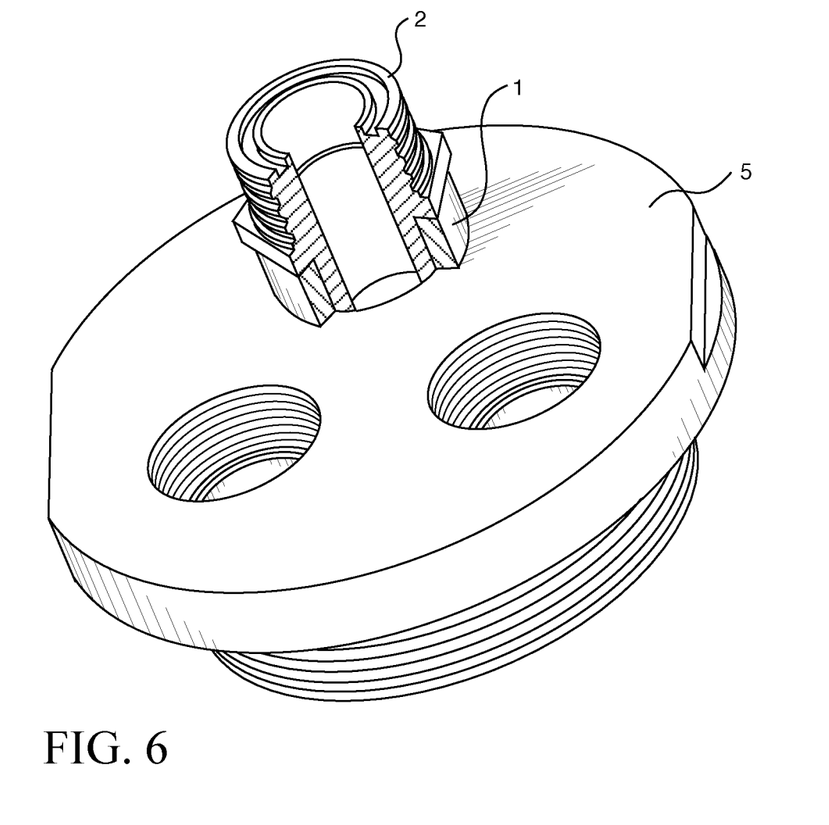
FIG. 6 shows a perspective view of the o-ring in use on the adapter between the adapter and the main head of a water filtration tank.
Figure 7:
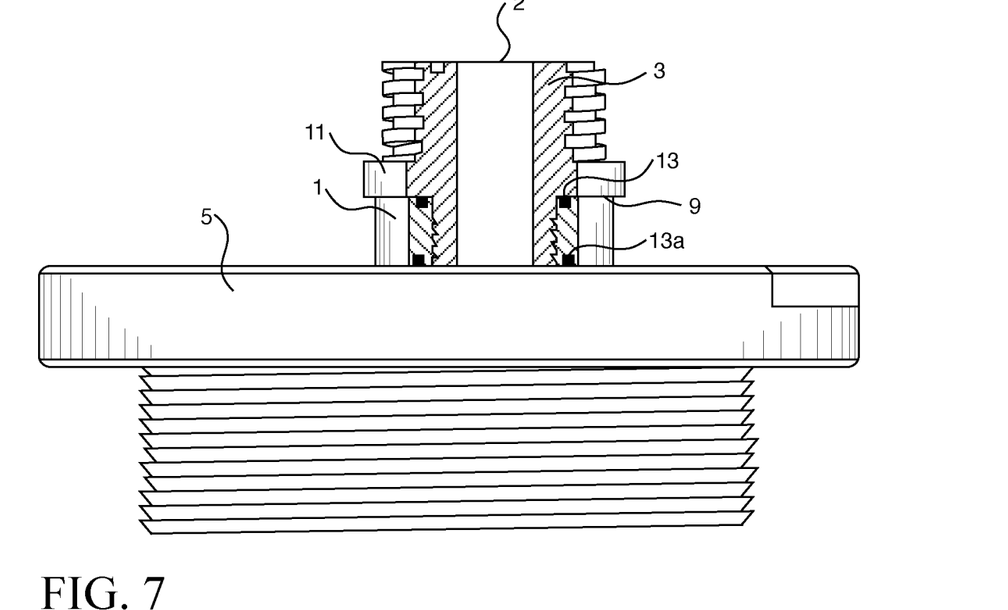
FIG. 7 shows a prior art tank head and the cut-out adapter and o-ring in elevation.

With particular reference to prior art FIGS. 1 and 2, in the traditional environment, a brass National Pipe Thread (NPT) fitting 6 connects the tubing/pipe to the main tank head 5 of a water filtration tank having a main tank head 5. The NPT fitting 6 has a pipe connection end 3 (upper thread) and tank connection end 4 (lower thread). Typically, pipe tape is applied to each threaded portion to aid the seal. The adapter or fitting can be metal or plastic.

With particular reference to FIGS. 3-7, the instant invention is a collar 1 formed as a ring adapted to slid onto the tank connection end 4 of the adapter 2. The collar 1 has a smooth inner surface 7, a smooth outer surface 8, a top surface 9 and a bottom surface 10. In this embodiment, the outer surface 8 is generally perpendicular (edges can be rounded and there can be minor manufacturing deviations) to the top or bottom surface 9, 10 to form a disk-like shape with the top surface 9 and bottom surface 10 having substantially equal surface areas, again differing only by minor manufacturing deviations. In use, upon being slid on to tank connection end 5 of adapter/fitting 2, the top surface 9 would abut the hexagonal nut portion 11 of the adapter 2 which typically divides the tank connection end 4 and the pipe end 3 threads of the adapter 2. The bottom surface 10 is the lowermost surface of the collar 1 adapted to abut the tank head 5 upon assemblage. The collar 1 can be made of plastic or metal and can be used on a fitting 2 that is also made of either material.

The top surface 9 of the collar 1 has a top channel 12 defined therein. "Top" and "bottom" are used to differentiate components and are not meant to identify a required location. The top channel 12 is cup-shaped with two right angles X and X', i.e. nearly rectangular in a cross section through section A-A (see FIGS. 4 and 4a). A top o-ring 13 is disposed within the top channel 12, thereby at the top surface 9 of the collar 1. The top o-ring 13 is rectangular, preferably square, in a cross section through the same section of A-A, or the vertical plane, conforming to the shape of the top channel 12 rising up just above top surface 9 of collar 1 (non-coplanar) so as to be substantially within channel 12 and seal upon compression. In the exemplary embodiment the top o-ring 13 is rectangular/square in cross section because, although not ideal in some applications, here it is because the square cross section O-rings provide more surface coverage when the hexagonal nut portion 11 and top surfaces 9 are engaged.

The bottom surface 10 of the collar 1 similarly has a bottom channel 20 defined therein. Like the top channel 12, the bottom channel 20 is also cup-shaped with two right angles Y and Y', i.e. generally rectangular in a cross section through section A-A (see FIGS. 4 and 4a). A bottom o-ring 13a is disposed within the bottom channel 20, thereby at the bottom surface 10 of the collar 1. The bottom o-ring 13a is rectangular, preferably square, in a cross section through the same section of A-A, or the vertical plane, conforming to the shape of the bottom channel 20 rising just past the bottom surface 10 of collar 1 (non-coplanar) so as to be substantially within bottom channel 20 and seal upon compression against the main tank head.

The top channel 12 and therefore the top o-ring 13 is offset medially towards the center. "Offset medially towards the center" means the top o-ring 13 is not in the middle of the collar 1, but is situated towards the inner surface 7 of the collar 1 and therefore has an inner diameter which is closer in measurement to the inner diameter of the collar 1 than the outer diameter of the collar 1. The bottom o-ring 13a is disposed on the bottom surface 10, offset medially away from the center. "Offset medially away from center" means this bottom o-ring 13a is not in the middle of the collar 1 but instead is situated towards the outer surface 8 of the collar 1 and therefore has an inner diameter which is closer in measurement to the outer diameter of the collar 1 than the inner diameter of the collar 1. Thus, the bottom o-ring 13a and the top o-ring 13 are concentric upon assemblage but have different diameters. The offset positioning of the o-rings 13, 13a is important because when these are being applied to a tapered thread engagement the O-rings 13, 13a need to be offset to allow proper sealing surface when the positive stop is employed and even without tapering, the hexagonal nut portion may not extend far past the main tank head so the two rings 13, 13a would not aligned upon assemblage. As an example only but by no means meant to be limiting, in an exemplary embodiment, with an inner diameter of the collar 1 at 1.325": (1) the inner diameter of the top o-ring 13 is 1.375"; (2) the outer diameter of the top o-ring 13 is 1.595"; (3) the inner diameter of the bottom o-ring 13a is 1.487"; (4) the outer diameter of the bottom o-ring 13a is 1.707".

Figure 8:
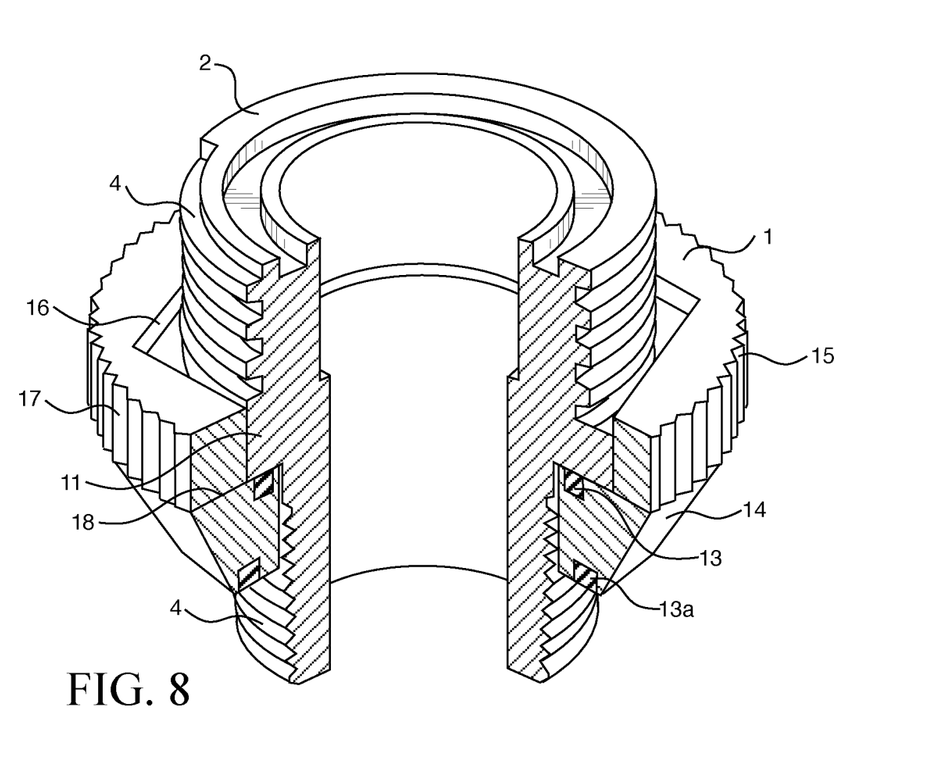
FIG. 8 shows a cut-out perspective view of an alternative embodiment of the o-ring including a slanted outer surface and knurled top.
Figure 9:
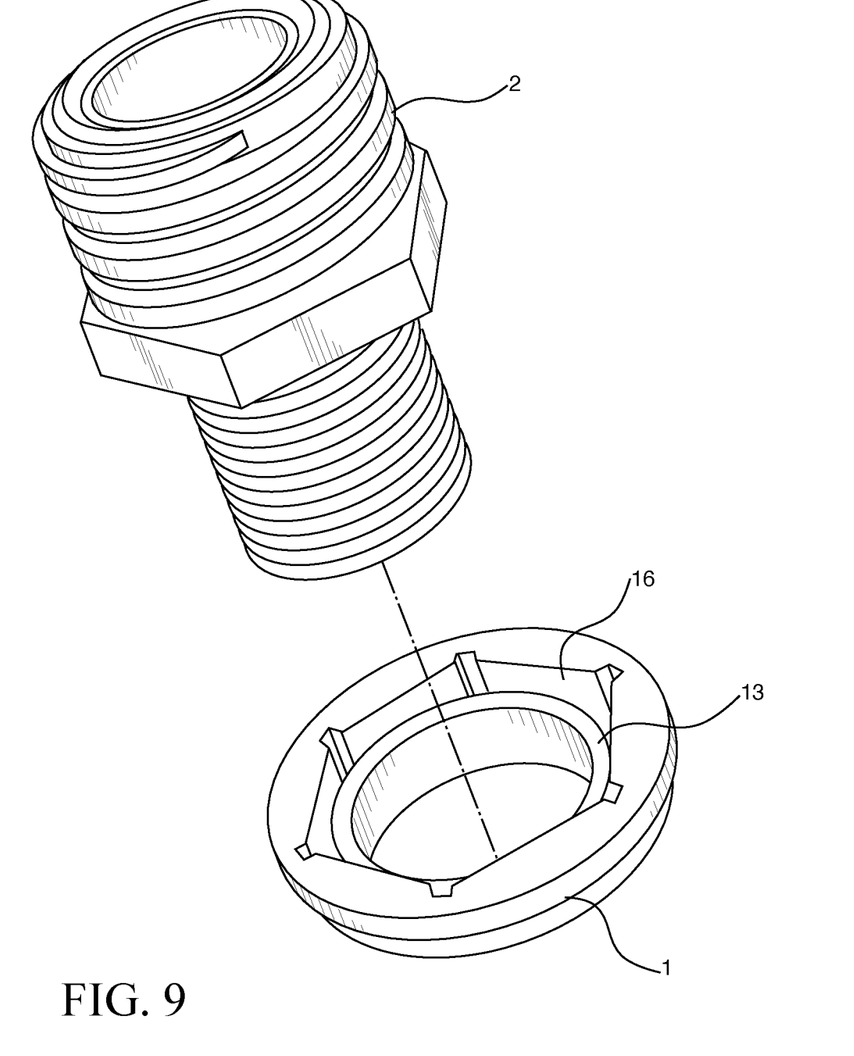
FIG. 9 shows a perspective view of the embodiment of FIG. 8 in both assembled and unassembled form.

Referencing now FIGS. 8-9, shown is an alternative embodiment of the collar 1 wherein the outer face 14 of collar 1 is angled outwardly from bottom surface 10 to top surface 9 as shown, resulting in the top surface 9 having a larger surface area than the bottom surface 10 of collar 1, termed herein band surface 18 for this particular embodiment. An upper band 15 is disposed on band surface 18. Upper band 15 is a rigid disk having an upper band inner surface 16 which is defined as a hexagonal indention to conform to the shape of the nut portion 11 of the adapter 2, here also hexagonal (but can vary). In use, upper band inner surface 16 encapsulates the nut portion 11 to aid in tightening the combination of the collar 1 and adapter 2. Upper band 15 has an upper band outer surface 17 which is preferably knurled to act a hand grip.

In use, the collar 1 is threaded onto tank connection end 4 of adapter 2. Top o-ring 13 forms a water-tight seal between nut portion 11 and the collar 1. The adapter 2 and collar 1 combination is then hand-tightened onto main tank head, the bottom surface 10 of the collar 1 with bottom o-ring 13a now abutting the main tank head 5 while forming a water tight seal between tank head 5 and collar 1. Accordingly, a water-tight seal is formed at the tank connection end 4 and tank head 5, the collar 1 with o-ring combination 13, 13a functioning as both a positive stop and as a substitute for pipe tape.

I claim:

1. In a filtration system including a tank having a main tank head and further including an adapter connected to said main tank head, said adapter having a pipe connection end, a tank connection end and a nut portion separating the pipe connection end and the tank connection end, the improvement comprising:
 a collar, said collar having an inner surface, an outer surface, a top surface and a bottom surface, said top surface adapted to abut said nut portion upon placement on said tank connection end;
 said top surface having defined therein a top channel;
 a top o-ring disposed within said top channel, thereby sealing against said nut portion;
 said top channel offset medially towards said inner surface;
 said bottom surface having defined therein a bottom channel;
 said bottom channel offset medially towards said outer surface, and,
 a bottom o-ring disposed within said bottom channel, thereby sealing against said main tank head.

2. The improvement of claim 1, wherein said top surface and said bottom surface have substantially equal surface areas.

3. The improvement of claim 1, wherein said top channel is cup-shaped.

4. The improvement of claim 3, wherein said top o-ring is rectangular in cross-section to conform to a shape of said top channel to fit substantially within said top channel.

5. The improvement of claim 1, wherein said bottom channel is cup-shaped.

6. The improvement of claim 5, wherein said bottom o-ring is rectangular in cross-section to conform to a shape of said bottom channel to fit substantially within said bottom channel.

7. The improvement of claim 1, wherein each said inner surface, said outer surface, said top surface and said bottom surface is smooth.

8. The improvement of claim 1, wherein said outer surface is generally perpendicular to said top surface.

* * * * *